United States Patent [19]

Wu

[11] Patent Number: 5,492,211
[45] Date of Patent: Feb. 20, 1996

[54] BICYCLE FREEWHEEL GEAR CLUSTER MOUNTING STRUCTURE

[75] Inventor: Chin F. Wu, Nantou, Taiwan

[73] Assignee: Keyin En Cho, Ltd., Nantou, Taiwan

[21] Appl. No.: 303,694

[22] Filed: Sep. 9, 1994

[51] Int. Cl.[6] ............................. F16D 41/24; B60B 27/04
[52] U.S. Cl. ........................ 192/115; 192/64; 301/110.5
[58] Field of Search .................... 192/64, 46, 115; 301/110.5, 105.1

[56] References Cited

U.S. PATENT DOCUMENTS

| | | | |
|---|---|---|---|
| 2,489,934 | 11/1949 | Schwinn | 192/64 |
| 4,580,670 | 4/1986 | Nagano | 192/64 |
| 5,129,711 | 7/1992 | Chen | 301/110.5 |
| 5,332,294 | 7/1994 | Haeussinger | 301/110.5 |
| 5,433,306 | 7/1995 | Yang | 192/64 |

Primary Examiner—Richard M. Lorence
Attorney, Agent, or Firm—Beveridge, DeGrandi, Weilacher & Young

[57] ABSTRACT

A bicycle freewheel gear cluster mounting structure including a wheel hub having a toothed hole and a circular recess around two opposite ends of a longitudinal center through hole thereof; a lock nut mounted within the circular recess to hold a bearing assembly and a freewheel gear cluster around the bearing assembly; and a hollow T-rod having a toothed head at one end meshed with the toothed hole on the wheel hub and a screw rod section at an opposite end inserted through the longitudinal center through hole of the wheel hub and threaded into the lock nut.

4 Claims, 4 Drawing Sheets

5,492,211

BICYCLE FREEWHEEL GEAR CLUSTER MOUNTING STRUCTURE

BACKGROUND OF THE INVENTION

FIGS. 1 and 2 shows the arrangement of the bicycle wheel hub and freewheel gear cluster of a regular bicycle, comprised of a wheel hub 10, which comprises a longitudinal center through hole 11, a circular recess 16 at one end around the through hole 11, and a toothed hole 13 within the circular recess 16 around the through hole 11, a freewheel gear cluster 20, which consists of a set of gears 20, a hollow screw rod 30, a bearing assembly 40, a toothed locating block 14 with an inner thread 12 fastened to the toothed hole 13 of the hub 10, and a cap 15 mounted within the circular recess 16 to hold down the toothed locating block 14. The bearing assembly 40 comprises a coupling block 42 having inside teeth 41 meshed with the locating block 14 and disposed outside the cap 15, a ball bearing 43, a socket 44 with longitudinal ribs 45, a cup 46, and a cylindrical connecting rod 47. The coupling block 42 and the cup 46 are fastened together through screw joint and received inside the socket 44. The connecting rod 47 has one end inserted through the coupling block 42 and the cup 46 and terminating in an outward flange 48 stopped outside the cup 46, and an opposite end fastened to the inner thread 12 of the locating block 14 by screw joint. The freewheel gear cluster 20 is mounted around the longitudinal ribs 45 of the socket 44. The screw rod 30 is inserted through the longitudinal center through hole 11 of the hub 10 and the bearing assembly 40 and fastened to a quick release (not shown). This bicycle freewheel gear cluster mounting structure has drawbacks. Because the hub 10 must be made in integrity and the locating block 14 must be punched into the toothed hole 13 and then held down by the cap 15, the manufacturing and installation costs are high. When the locating block 14 is punched into engagement with the toothed hole 13, the center of the locating block 14 may be biased from longitudinal alignment with the longitudinal center through hole 11, causing the freewheel gear cluster 20 and the hub 10 not to have a common center. If the freewheel gear cluster 20 and the hub do not have a common center, the shifting of the gear will not be smoothly operated. Because the socket 44 and the freewheel gear cluster 20 are connected to the hub 10 at one side by the connecting rod 47 and the connecting rod 47 is fastened to the locating block 14, power is difficult to be uniformly distributed through the hub 10, and the freewheel gear cluster 20 may be forced to cause an eccentric effect. Furthermore, the connection between the connecting rod 47 and the locating block 14 is difficult to achieve and needs special techniques.

SUMMARY OF THE INVENTION

The present invention has been accomplished to provide a bicycle freewheel gear cluster mounting structure which eliminates the aforesaid drawbacks. It is an object of the present invention to provide a bicycle freewheel gear cluster mounting structure which keeps the freewheel gear cluster and the hub in perfect concentricity. It is another object of the present invention to provide a bicycle freewheel gear cluster mounting structure which is simple in structure and easy to install.

To achieve these objects, there is provided a bicycle freewheel gear cluster mounting structure comprised of a wheel hub having a toothed hole and a circular recess around two opposite ends of a longitudinal center through hole thereof; a lock nut mounted within the circular recess to hold a bearing assembly and a freewheel gear cluster around the bearing assembly; and a hollow T-rod having a toothed head at one end meshed with the toothed hole on the wheel hub and a screw rod section at an opposite end inserted through the longitudinal center through hole of the wheel hub and threaded into the lock nut.

BRIEF DESCRIPTION OF THE DRAWINGS

FIG. 1 is an end view of the coupling block of the bicycle freewheel gear cluster mounting structure shown in FIG. 1;

DETAILED DESCRIPTION OF THE PREFERRED EMBODIMENT

Figure 1:
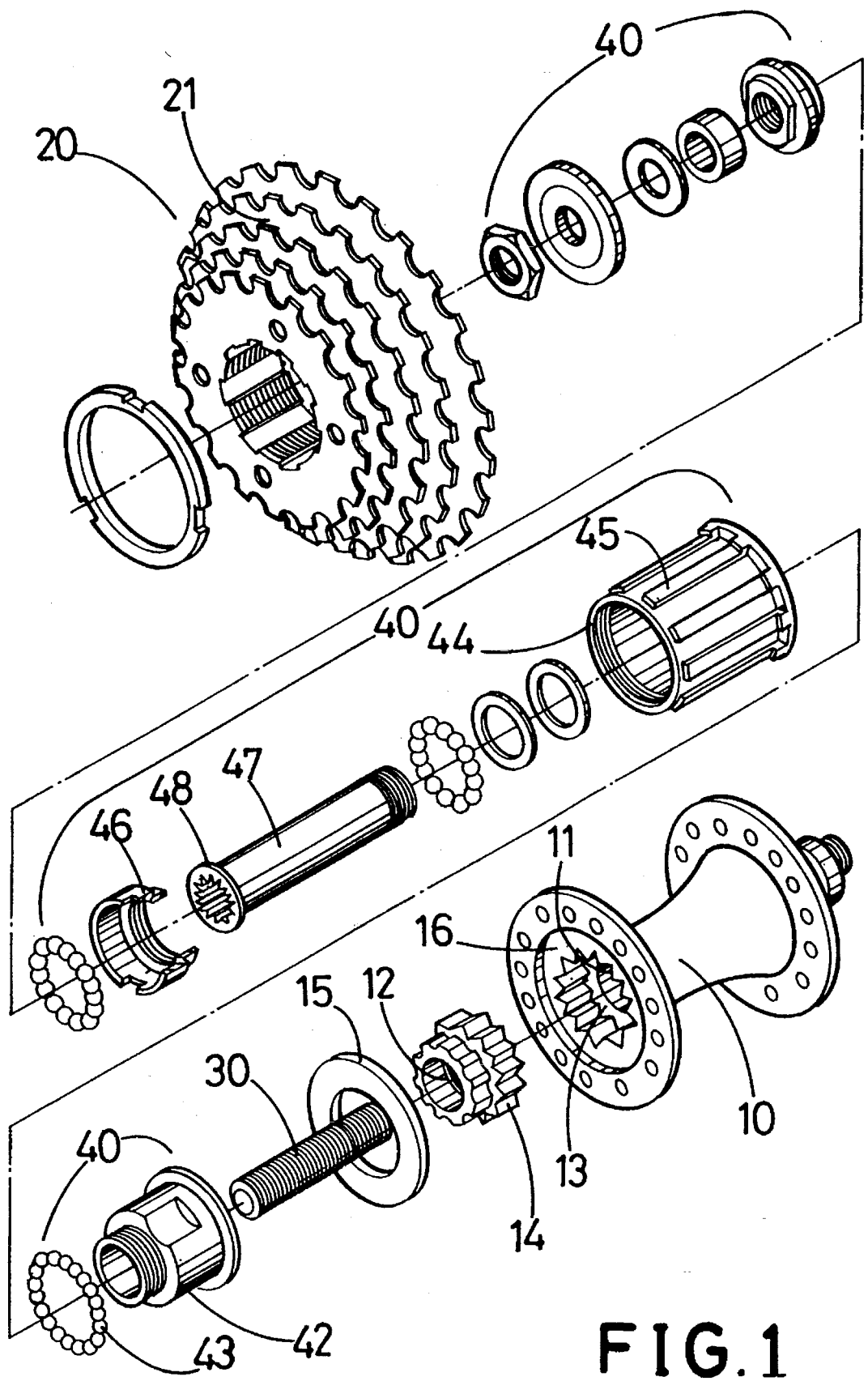
FIG. 1 is an exploded view of bicycle freewheel gear cluster mounting structure according to the prior art.
Figure 1A:
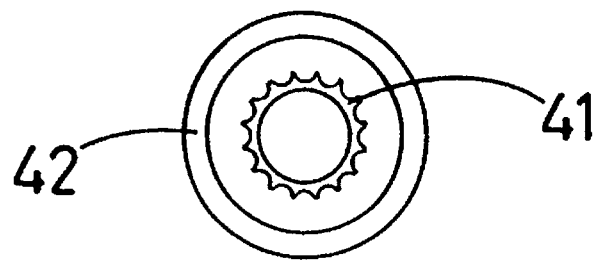
FIG 1B is an end view of the socket of the bicycle freewheel gear cluster mounting structure shown in FIG. 1.
Figure 1B:
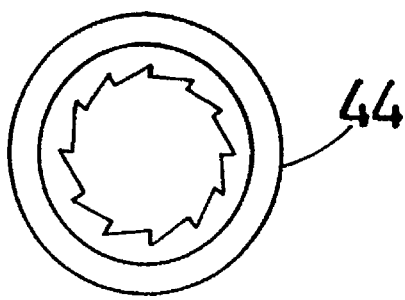
Figure 3A:
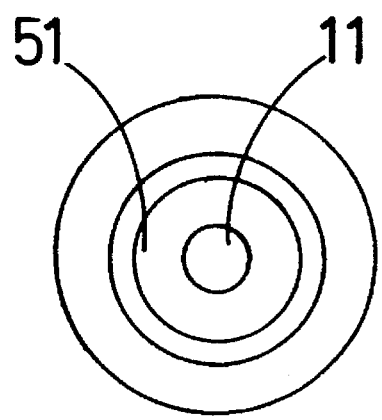
FIG. 3A is an end view of the wheel hub of the bicycle freewheel gear cluster mounting structure shown in FIG. 3.
Figure 2:
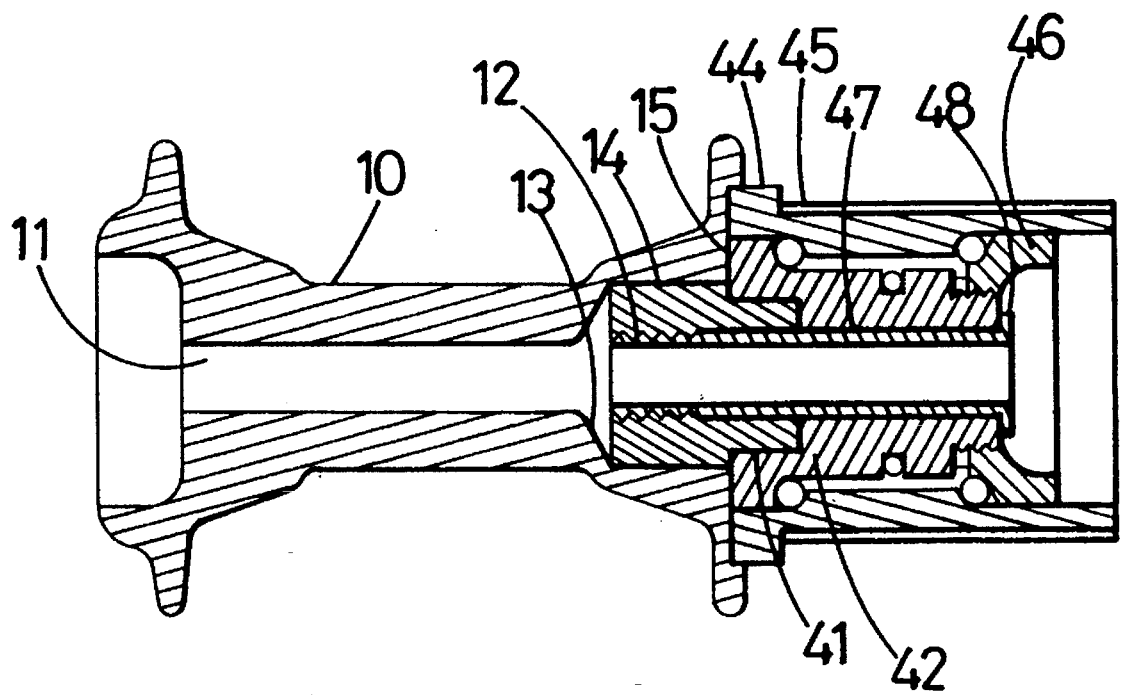
FIG. 2 is an assembly view in longitudinal section of the bicycle freewheel gear cluster mounting structure shown in FIG. 1.
Figure 4:
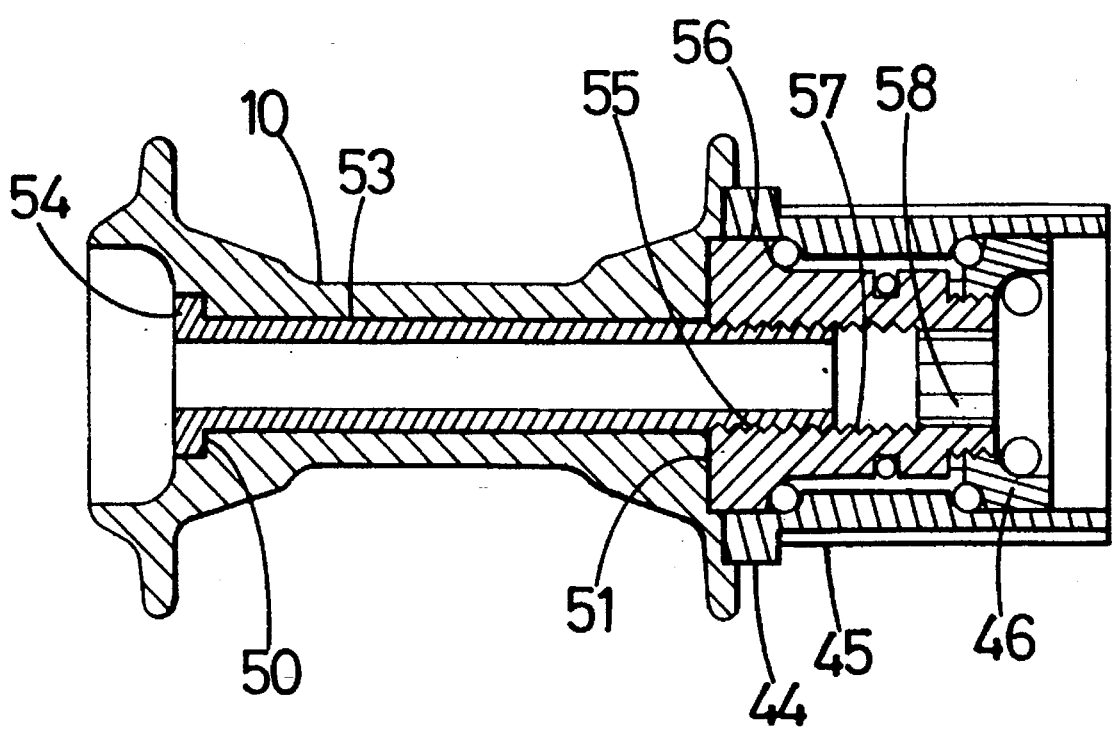
FIG. 4 is an assembly view in longitudinal section of the bicycle freewheel gear cluster mounting structure shown in FIG. 3.
Figure 3:
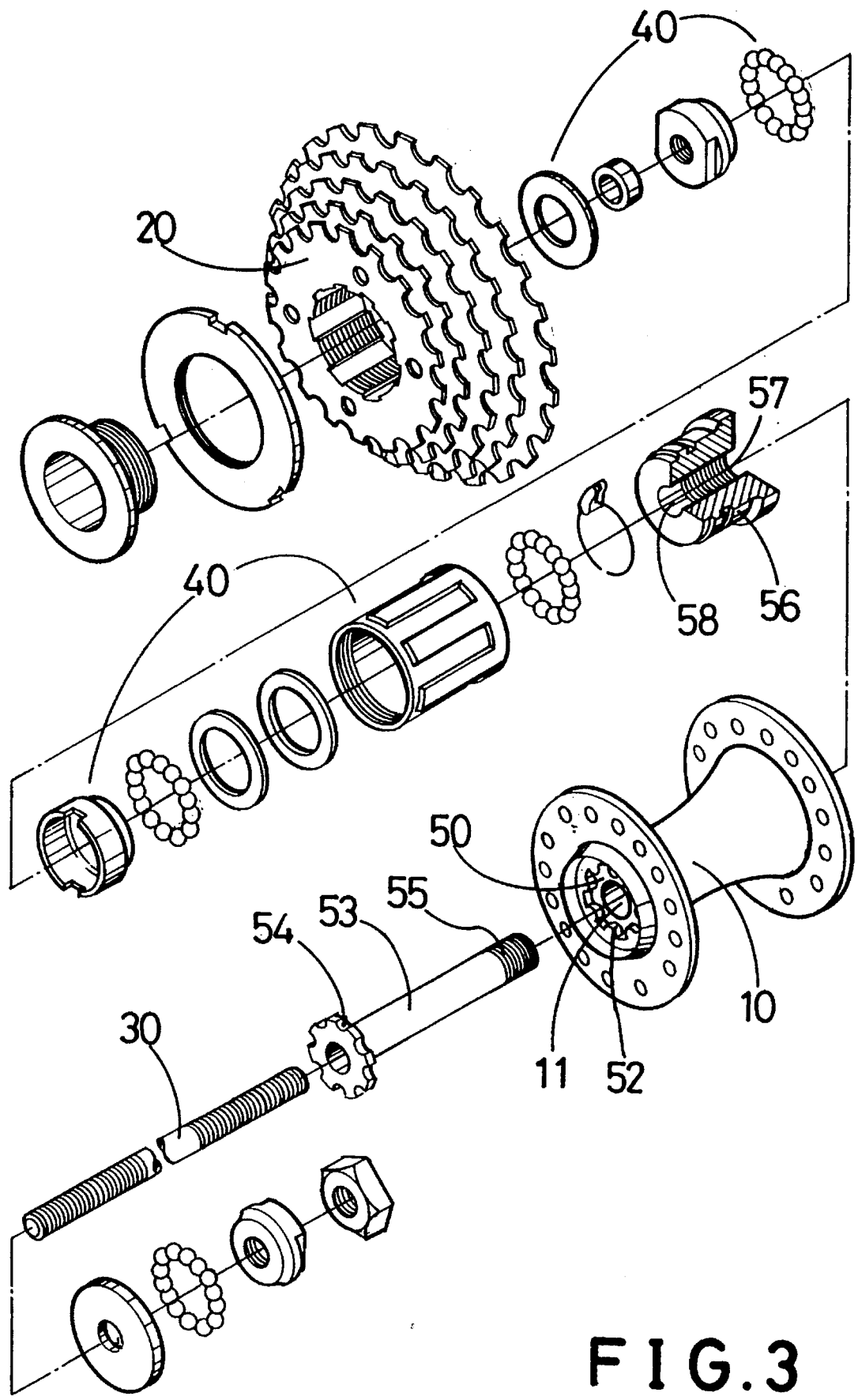
FIG. 3 is an exploded view of bicycle freewheel gear cluster mounting structure according to the present invention.

Referring to FIGS. 3 and 4, the bicycle freewheel gear cluster mounting structure of the present invention is generally comprised of a bicycle wheel hub 10, a freewheel gear cluster 20, a screw rod 30, and a bearing assembly 40. The hub 10 has a toothed hole 50 and a circular recess 51 around the longitudinal center through hole 11 thereof at both ends. The toothed hole 50 defines a set of teeth 52 around the longitudinal center through hole 11. A hollow T-rod 53 is provided having toothed head 54 at one end meshed with the teeth 52, and a screw rod section 55 at an opposite end inserted through the longitudinal center through hole 11 of the hub 10 and screwed up with a lock nut 56. The lock nut 56 is mounted within the circular recess 51 of the hub 10, defining a screw hole 57 and a polygonal tool hole 58 longitudinally aligned with the screw hole 57. The screw hole 57 receives the screw rod section 55 of the hollow T-rod 53. The diameter of the polygonal tool hole 58 is slightly smaller than the screw hole 57 and provided for turning the lock nut 56 onto the screw rod section 55 of the hollow T-rod 53 by a spanner or socket wrench. Because the hollow T-rod 53 has two opposite ends respectively fastened to the teeth 52 of the toothed hole 50 of the hub 10 and the screw hole 57 of the lock nut 56, which is received within the circular recess 51 on the hub 10, the concentricity between the hollow T-rod 53 and the hub 10 is assured. After the installation of the socket 44 and cup 46 of the bearing assembly 40 in the lock nut 56, the freewheel gear cluster 20 is mounted around the longitudinal ribs 45 of the socket 44, and then the screw rod 30 is inserted through the hollow T-rod 53 and fastened to a quick release (not shown) to complete the installation of the freewheel gear cluster 20.

Because the toothed head 54 of the hollow T-rod 53 is engaged with the teeth 52, which are integrally made on the hub 10, turning the freewheel gear cluster 20 causes the lock nut 56 to turn the hub 10 via the hollow T-rod 53.

What is claimed is:

1. A bicycle freewheel gear cluster mounting structure comprising:
   - a wheel hub having a toothed hole and a circular recess around two opposite ends of a longitudinal center through hole thereof;
   - a locating member mounted within said circular recess to hold a bearing assembly and a freewheel gear cluster around said bearing assembly; and
   - a hollow T-rod having a toothed head at one end meshed with the toothed hole on said wheel hub, and a rod section at an opposite end inserted through the longitudinal center through hole of said wheel hub and fastened to said locating member.

2. The bicycle freewheel gear cluster mounting structure of claim 1 wherein said toothed hole is a recessed hole integrally formed on said wheel hub and defining a set of teeth around one end of the longitudinal center through hole of said hub.

3. The bicycle freewheel gear cluster mounting structure of claim 1 wherein said rod section of said hollow T-rod comprises an outer thread fastened to said locating member by screw joint.

4. The bicycle freewheel gear cluster mounting structure of claim 3 wherein said locating member comprises a longitudinal center through hole formed of a screw hole at one end, into which the outer thread of said rod section is threaded, and a polygonal tool hole at an opposite end.

* * * * *